United States Patent
Yokomizo

(10) Patent No.: US 6,376,220 B1
(45) Date of Patent: Apr. 23, 2002

(54) MANNOSE-CONTAINING COPRA MEAL COMPOSITION

(75) Inventor: Futoshi Yokomizo, Izumisano (JP)

(73) Assignee: Fujii Oil Co., Ltd., Osaka (JP)

( * ) Notice: Subject to any disclaimer, the term of this patent is extended or adjusted under 35 U.S.C. 154(b) by 0 days.

(21) Appl. No.: 09/913,286

(22) PCT Filed: Feb. 25, 2000

(86) PCT No.: PCT/JP00/01087

§ 371 Date: Aug. 13, 2001

§ 102(e) Date: Aug. 13, 2001

(87) PCT Pub. No.: WO00/49890

PCT Pub. Date: Aug. 31, 2000

(30) Foreign Application Priority Data

Feb. 26, 1999 (JP) .............................................. 11-52035

(51) Int. Cl.⁷ ........................... A23K 1/16; C12P 19/02; C12P 19/14
(52) U.S. Cl. ......................... 435/105; 435/99; 435/100; 435/101; 435/200; 435/274
(58) Field of Search .......................... 435/99, 100, 105, 435/200, 274, 101; 426/20, 28, 53

(56) References Cited

U.S. PATENT DOCUMENTS 6,080,442 A * 6/2000 Yoshikawa et al. ......... 426/617

OTHER PUBLICATIONS

Computer Abstract JPAB JP11018791 Donpou Et Al Jan. 1999.*

* cited by examiner

*Primary Examiner*—Herbert J. Lilling
(74) *Attorney, Agent, or Firm*—Roylance, Abrams, Berdo & Goodman, L.L.P.

(57) ABSTRACT

The gist of the present invention resides in a mannose-containing copra meal composition obtained by allowing two enzymes, xylanase and β-galactomannan, to act on copra meal, and in a method for preparing the same, in which mannose can be liberated efficiently and economically by combining the two enzymes. A decreasing effect against Salmonella is expected at an economical cost, by adding into feeds the mannose-containing copra meal composition according to the present invention or mannoses obtained from the composition by extraction.

5 Claims, 1 Drawing Sheet

(※) GMase: β- Galactomannanase
Hcase: Xylanase

MANNOSE-CONTAINING COPRA MEAL COMPOSITION

TECHNICAL FIELD

The present invention relates to a mannose-containing copra meal composition useful as a feed additive having an expected decreasing effect against Salmonella, and a method for preparing such a composition.

BACKGROUND ART

Hitherto, it is known that a decreasing effect against Salmonella is expected by adding mannoses to feeds (Poultry Science 1989 68 1357). Furthermore, it is also conventionally known that mannan is contained rich in copra meal produced as an extraction residue of coconut oil. It has been reported blending mannose polysaccharides, which are obtained by allowing enzymes to act on material containing galactomannans such as copra meal into feeds, is effective for prevention of contamination with Salmonella (Japanese Patent Application Laid-Open No. Hei 8-173055). However, the enzyme used therefor is a β-mannosidase or galactomannanase simple substance or its combination with α-galactosidase, and the objective compounds are oligosaccharides and polysaccharides, not mannose. Mannoses are different in performances between monosaccharides and oligosaccharides or polysaccharides. Mannose monosaccharides are reported to act most useful against Salmonella. However, mannoses are expensive, thus addition thereof into feeds results in an economical burden for poultry farming. In these circumstances, it is required in the market to provide more inexpensive mannoses as feed additives in due consideration of the effect and production cost aspects.

DISCLOSURE OF THE INVENTION

As described above, mannose monosaccharides are recognized to have a sterilizing effect against noxious bacteria and required to be added into feeds, but they are very expensive and thus hardly used practically. Furthermore, oligo-mannoses have been developed, but a decreasing effect thereof against Salmonella is not greatly expected (Poultry Disease Study Report 1995 31 113).

Copra meal is produced as an extraction residue of coconut oil and utilized per se as feeds for animals. However, copra mannan contained therein at a proportion of 30–36% is hardly digestive, and additionally, there is little decreasing effect thereof against Salmonella. Thus, it is hard to say that the copra mannan is utilized effectively. The inventors of the present invention found that mannose monosaccharides are liberated more when combined β-galactomannanase and xylanase act on copra meal than where only one enzyme acts on copra meal, to complete the present invention. That is, the present invention relates essentially to a mannose-containing copra meal composition obtained by allowing two enzymes, xylanase and β-galactomannanase, to act on copra meal, and a method for preparing it.

β-galactomannanase to be used may be any commercially available one such as Hemicellulase GM "Amano"; Amano Seiyaku K.K. and Sumiteam ACH; Shinnihon Kagaku Kogyo K.K., and slso, xylanase may be any commercially available one (such as Hemicellulase "Amano" 90; Amano Seiyaku K.K.). Those commercially available ones are almost all derived from *Aspergillus niger*.

The amount of enzymes used is 1000–5000 u (units) as the total activity value of xylanase and β-galactomannanase relative to 10 g of copra meal, wherein the enzyme activity ratio of xylanase to β-galactomannanase is 0.2–12, preferably 0.5–8, more preferably 1.3–3. If the xylanase activity is too low or the β-galactomannanase activity is too low, an efficient reaction cannot be realized.

These enzymes are allowed to act on copra meal. Copra meal produced as an extraction residue of coconut oil may be used wherein 30–36% by weight of mannan is generally contained. While the enzymes may be mixed with copra meal homogeneously, the water content in the reaction system is considerably necessary for homogeneous mixing since copra meal is highly water absorptive. However, the water content should be minimized as much as possible within the necessary amount since water removal in the refining step of mannose is necessary. The appropriate water content in the reaction system is 50–70% by weight, preferably 58–62% by weight. Although xylanase and β-galactomannanase may be added separately, it is convenient to prepare aqueous solutions of both enzymes in an amount of water sufficient to make the above-mentioned reaction system, then add the solutions to copra meal and mix them.

The enzymatic reaction is followed. The enzymatic reaction according to the present invention constitutes of two steps. It is efficient to have xylanase act at first for decomposing mannan roughly beforehand and thereafter to have β-galactomannanase act for obtaining mannose. For this, an optimum temperature at which xylanase acts is maintained for a specified period at first and thereafter the reaction may proceed at an optimum temperature for β-galactomannanase. Since the optimum temperature for β-galactomannanase is higher than the optimum temperature for xylanase, there are less damage such as deactivation of the enzyme having lower optimum temperature even though the both enzymes are added from the beginning, which is convenient for changing the optimum temperatures without any necessity of cooling the reaction system.

Copra meal treated by the method according to the present invention contains liberated mannose monosaccharides. The copra meal can exhibit a sterilizing effect particularly against Salmonella when added in feeds appropriately after drying, or after extracting water-soluble fraction from the copra meal.

For example, 10–15 g of mannose is produced from 100 g of copra meal according to the present invention, which corresponds to about 4–7.5% of the whole. Thus, the treated copra meal can be blended in dried feeds or the like. If the blended amount thereof is about 0.25–1%, the mannose content in the blended feed is 0.01–0.075%, thus a decreasing effect against noxious bacteria such as Salmonella can be attained.

Hereinafter, examples of the present invention will be described to illustrate the present invention in more detail, but the spirit of the present invention is not limited to the following examples. In examples, "%" and "parts" are based on weight.

EXAMPLES AND COMPARATIVE EXAMPLES 15 g of the prepared enzyme solutions were mixed to carry out the reactions, wherein the total weight of xylanase and β-galactomannanase was constantly $\frac{1}{30}$ g per 10 g of copra meal and the blended ratios of both enzymes were changed variously from 0:100 to 100:0. The reaction was carried out by introducing the mixture in a sealed vessel, allowing to stand at 50° C. for 24 hours in an incubator and thereafter allowing to stand and react at 60° C. for 48 hours in the incubator. Herein, as xylanase, Hemicellulase "Amano" 90 (made by Amano Seiyaku K.K., trade name, xylanase activity of 90000 unit/g or more) was used. As β-galactomannanase, Hemicellulase GM "Amano" (made by Amano Seiyaku K.K., trade name, β-galactomannanase activity of 45000 unit/g or more) was used.

From the results shown in Table 1, it is seen that a greater mannose is generated where β-galactomannanase and xylanase are combined than where the enzymes are each used alone. Determination of produced mannose was carried out as follows. 50 g of water was added to the enzyme-treated copra meal and kept for 10 minutes in a boiling bath, to deactivate enzyme and simultaneously dissolve the water-soluble components in an aqueous layer. Thereafter, the whole was determined volumetrically to 100 ml and filtered, to obtain an aqueous solution. The solution was appropriately subjected to pretreatment such as removal of protein, and then determined its mannose amount by using a high performance liquid chromatography.

TABLE 1

| | weight ratio of β-galactomannanase to xylanase | | | | | |
|---|---|---|---|---|---|---|
| | 0:100 | 10:90 | 20:80 | 30:70 | 40:60 | 50:50 |
| β-galactomannanase activity | 0 u | 150 u | 300 u | 450 u | 600 u | 750 u |
| xylanase activity | 3000 u | 2700 u | 2400 u | 2100 u | 1800 u | 1500 u |
| amount of produced mannose (mg) | 406 | 775 | 1144 | 1154 | 1163 | 1202 |

TABLE 1-continued

| | weight ratio of β-galactomannanase to xylanase | | | | |
|---|---|---|---|---|---|
| | 60:40 | 70:30 | 80:20 | 90:10 | 100:0 |
| β-galactomannanase activity | 900 u | 1050 u | 1200 u | 1350 u | 1500 u |
| xylanase activity | 1200 u | 900 u | 600 u | 300 u | 0 u |
| amount of produced mannose (mg) | 1241 | 1195 | 1149 | 974 | 799 |

Figure 1:
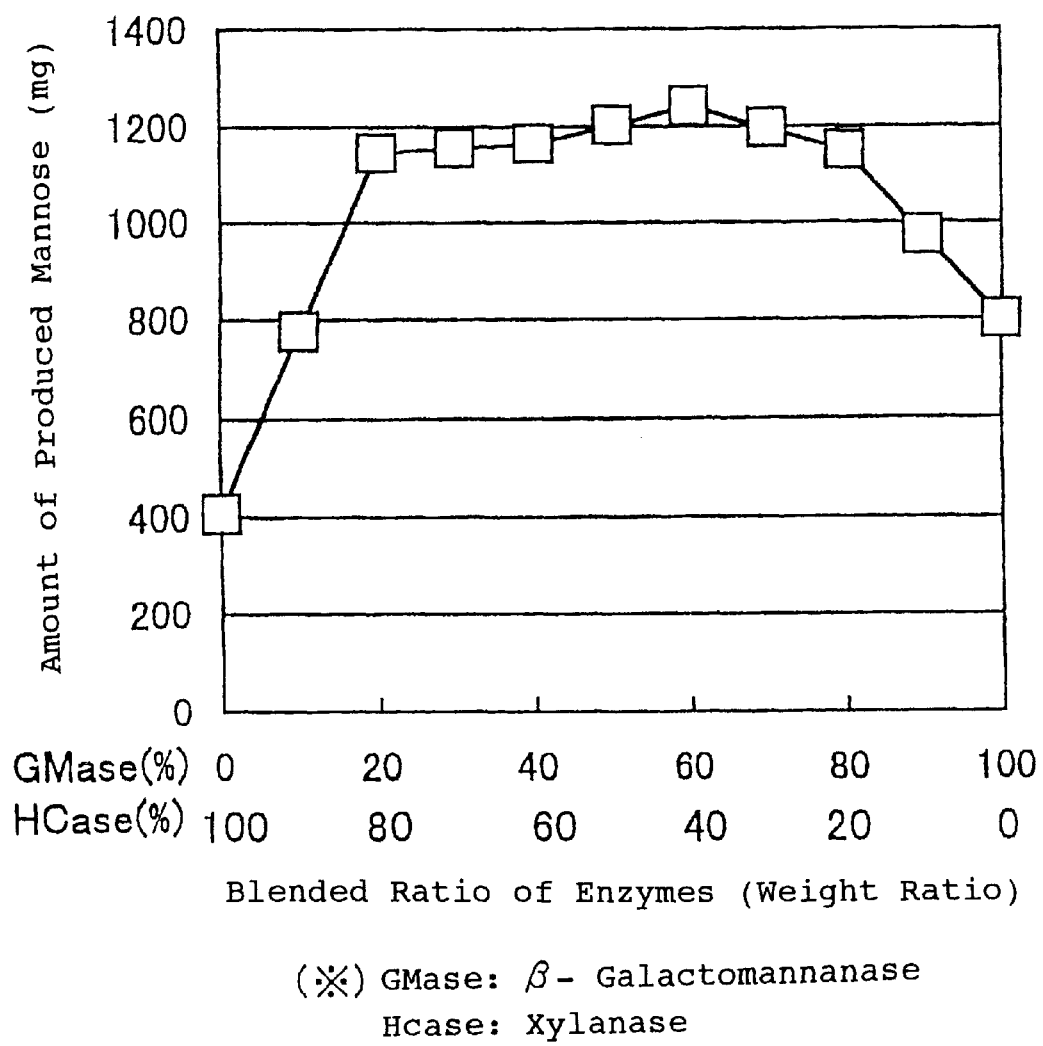
FIG. 1 is a graph expressing amounts of produced mannose shown in Table 1.

What is claimed is:

1. A mannose-containing copra meal composition obtained by allowing two enzymes, xylanase and β-galactomannanase, to act on copra meal.

2. A method of preparing a mannose-containing copra meal composition by allowing two enzymes, xylanase and β-galactomannanase, to act on copra meal.

3. A composition according to claim 1, wherein the enzymatic action ratio of xylanase to β-galactomannanase is 0.2–12.

4. A method according to claim 2, wherein the enzymatic action ratio of xylanase to β-galactomannanase is 0.2–12.

5. A method for preparing a mannose-containing copra meal composition by allowing xylanase and then β-galactomannanase to act on copra meal.

* * * * *